United States Patent [19]

Piatt et al.

[11] Patent Number: 4,736,213

[45] Date of Patent: Apr. 5, 1988

[54] MULTIPLE PRINT/CARTRIDGE INK JET PRINTER HAVING ACCURATE VERTICAL INTERPOSITIONING

[75] Inventors: Michael J. Piatt, Enon; Kevin L. Houser, Kettering; Kenneth R. McWilliams, Miamisburg, all of Ohio

[73] Assignee: Eastman Kodak Company, Rochester, N.Y.

[21] Appl. No.: 945,134

[22] Filed: Dec. 22, 1986

[51] Int. Cl.[4] .............................................. G01D 15/16

[52] U.S. Cl. ............................ 346/140 R; 346/139 C; 400/126; 400/175

[58] Field of Search .................... 346/140, 139 C, 145; 400/126, 175

[56] References Cited

U.S. PATENT DOCUMENTS

| | | | |
|---|---|---|---|
| 4,228,799 | 9/1981 | Uzawa et al. | 346/140 R |
| 4,350,448 | 9/1982 | Hanagata et al. | 400/120 |
| 4,364,067 | 12/1982 | Koto | 346/140 |
| 4,477,823 | 10/1984 | Matsufuji et al. | 346/140 R |
| 4,500,895 | 2/1985 | Buck | 346/140 |
| 4,539,570 | 9/1985 | Moore | 346/75 |
| 4,628,334 | 12/1986 | Dagna | 346/140 |

*Primary Examiner*—Joseph W. Hartary
*Attorney, Agent, or Firm*—John D. Husser

[57] ABSTRACT

Ink jet printing apparatus of the type having feed means for advancing successive line portions of a print medium past a linear print zone includes a plurality of carriages constructed to traverse the print zone in a predetermined direction and removably support a plurality of print/cartridges. Each of the carriages includes referencing edges that are substantially parallel to the direction of the carriages traverse and indexing means for moving supported print/cartridges into a precise detent relation with respective referencing surfaces of their carriage unit.

14 Claims, 6 Drawing Sheets

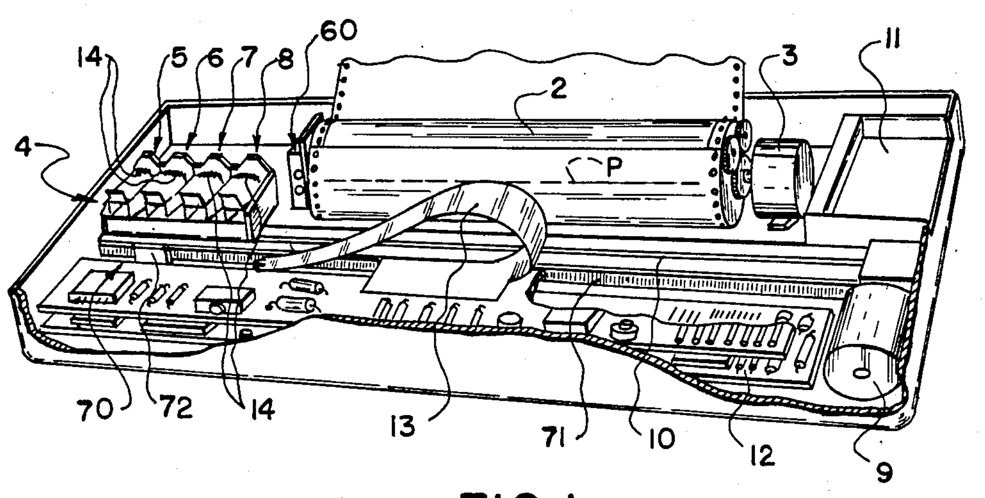
FIG. 1
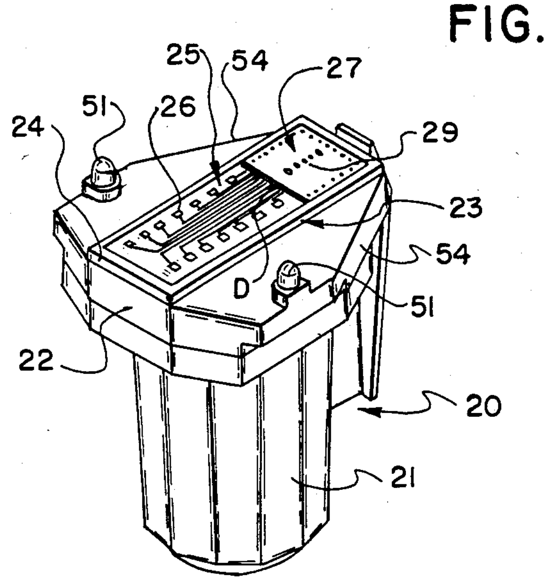
FIG. 2
FIG. 3
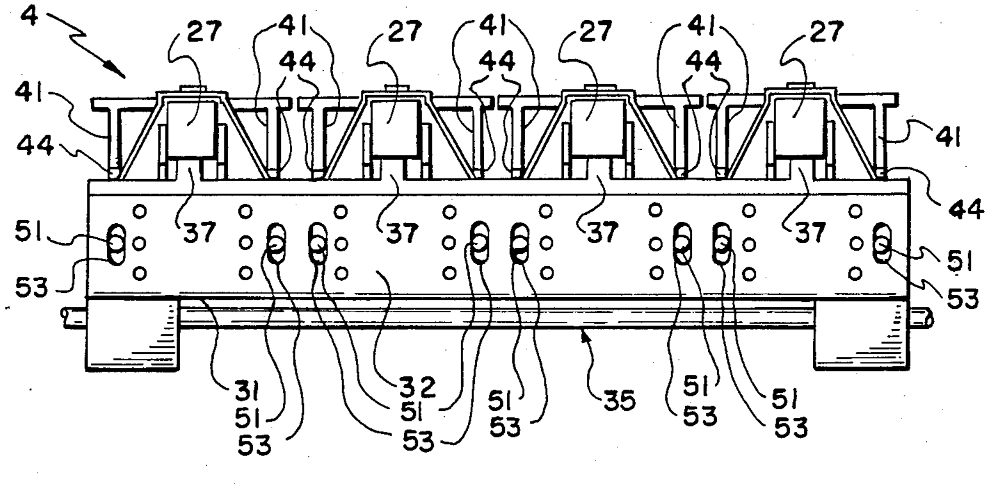

MULTIPLE PRINT/CARTRIDGE INK JET PRINTER HAVING ACCURATE VERTICAL INTERPOSITIONING

BACKGROUND OF INVENTION

1. Field of Invention

The present invention relates to ink jet printing apparatus wherein a plurality of discretely insertable print-/cartridges cooperate in producing a print and more particularly to printer constructions for accurately interpositioning such print/cartridges.

2. Description of Prior Art

There are known drop-on-demand ink jet printer systems in which a print head carriage assembly which supports a print head traverses the print head across the width of a print medium in line printing operation. Between line printing sequences, the print medium is advanced to prepare for the next sequence. One useful approach is to construct the print head element as part of a disposable print/cartridge which contains an ink supply, drop-generating structures and electrical connections adapted for coupling to printer systems, which provides drop-generating energy to such inserted print-/cartridge in accordance with information signals.

Heretofore, such disposable print/cartridge units have been employed one unit at a time in the printing operation and precise positioning and control of the print/cartridge's printing line locus, relative to the print medium is not required. That is, a particular print/cartridge, once inserted, will establish its particular line locus vis-a-vis the printer's print zone. Thus, variation of line locus between different print/cartridges (e.g. because of low tolerances within the print/cartridge and in the print/cartridge-printer interface) has not presented problems.

However, there exist applications where it would be desirable to use a plurality of such readily insertable print/cartridges, cooperatively, in page-printing. For example, it may be desired to print more than one color of ink on a printed page. Or, it may be desired to use a plurality of cooperative print/cartridges to increase the page-printing speed of the printer. In using more than one print/cartridge for cooperative printing on a single page, it is desirable to precisely interrelate the printing loci of those print/cartridges. Otherwise printing artifacts can occur, e.g. due to horizontal and/or vertical misregistration of the component line portions contributed by the respective print/cartridges.

The problem of providing precise interrelation for a plurality of discrete orifice arrays is difficult, even in apparatus where the orifice arrays form relatively permanent parts of a printer. When the orifice arrays comprise portions of insertable print/cartridges the problem is even more difficult, for the print/cartridges should be inexpensive, dictating a minimum of high tolerance construction features and minimum of high tolerance construction features and low tolerance assembly.

Commonly assigned U.S. Patent Application Ser. No. 945,136, entitled "Ink Jet Printer for Cooperatively Printing With A Plurality of Insertable Print/Cartridges" and concurrently filed in the name of M. Piatt, discloses a unique and advantageous approach for precisely interrelating a plurality of insertable print/cartridges for cooperative printing in an ink jet printer. The approach described in that application combines: (i) a precise physical positioning of the orifice arrays of such print/cartridges in regard to their vertical relation with the print zone and (ii) information printing adjustments to compensate for different horizontal interrelations of the orifice arrays with respect to the print zone. By utilizing partial physical and partial electrical inter-referencing of the print/cartridges, the approach described by that application greatly simplifies system positioning structures. The approach allows multi-array printing, via insertable print/cartridges, to be both economical and visually attractive.

SUMMARY OF INVENTION

One significant object of the present invention is to provide printer systems having simple and reliable constructions for positioning the orifice arrays of a plurality of cooperative print/cartridges in precise interrelation, e.g. as is useful in accordance with the approach of the above-noted Piatt application.

Another object is to provide such accurate interpositioning while imposing minimal high tolerance constructions in the print/cartridge fabrication.

A further object is to provide printer apparatus wherein a plurality of print/cartridges can be easily inserted and positioned to cooperate in the printing of line print portions without causing detractive misalignment artifacts in the vertical page direction.

In accord with one aspect of the invention, these objects are accomplished in ink jet printing apparatus of the type having means for advancing successive line portions of a print medium past a linear print zone, a system for cooperatively interpositioning a plurality of insertable print/cartridges which comprises: (a) a plurality of carriage units constructed to traverse the print zone in a predetermined direction and to removably support such print/cartridges; (b) a plurality of referencing surfaces respectively on each of the carriage units, such surfaces being substantially parallel to the direction of carriage traverse; and (c) indexing means for moving supported print/cartridges into a precise detent relation with respective carriage unit referencing surfaces.

In another aspect of the invention, each of the indexing means includes means for supporting a print/cartridge in a coarsely located position and cam means for moving a print/cartridge into the precise detent relation with the referencing surface of its carriage unit.

BRIEF DESCRIPTION OF THE DRAWINGS

The subsequent description of preferred embodiments refers to the attached drawings wherein:

FIG. 1 is a perspective view, with cover portions removed, of one preferred printer embodiment in accord with the present invention;

FIG. 2 is a perspective view of one embodiment of disposable print/cartridge which is useful in accord with the present invention;

FIG. 3 is a view of the print/cartridge carriage assemblies of the FIG. 1 printer embodiment, as viewed from the print zone side of the apparatus;

DETAILED DESCRIPTION OF PREFERRED EMBODIMENTS

Figure 4A:
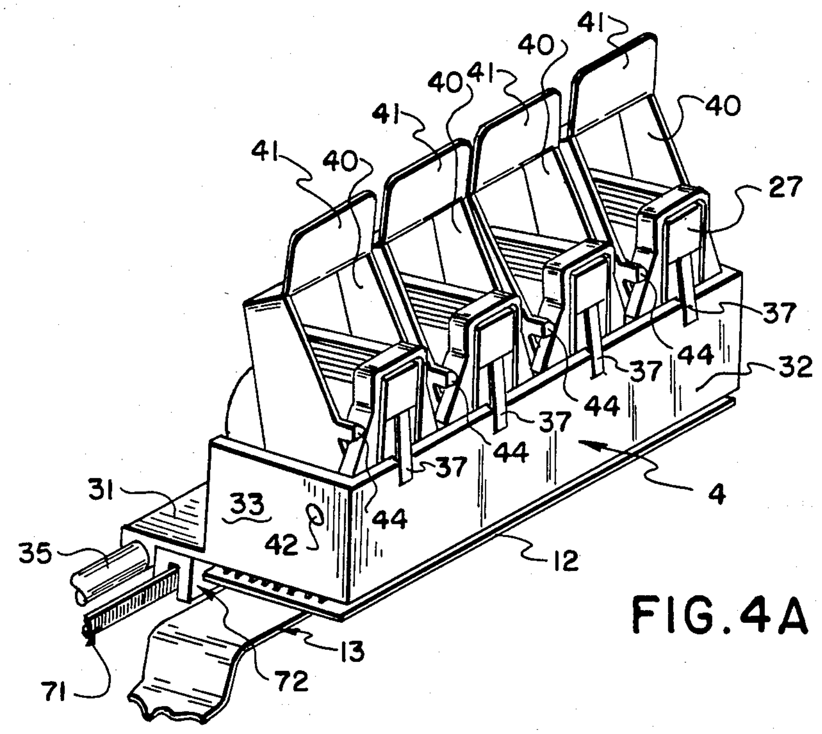
FIG. 4A and 4B are respectively a perspective and a side view, partially in cross section, of the print/cartridge carriage shown in FIGS. 1 and 3.

The ink jet printing apparatus shown in FIG. 1 in general comprises a print medium advancing platen 2 which is adapted to receive sheet or continuous print material, e.g. paper, from an ingress at the lower rear, and under the drive from motor 3, advance successive line portions of the medium past a print zone P, and out of the printer through a printer egress in the top of the printer. During the passage of successive line portions through the print zone, multi print/cartridge carriage 4 is traversed across the print zone so that print/cartridges placed in the four individual carriage nests 5, 6, 7 and 8 can effect printing operations, as subsequently described. The carriage 4 is slidingly mounted on a guide rail means 35 (see FIGS. 3, 4A and 4B) located beneath the print/cartridge support nests 5–8 and a carriage drive motor 9 effects traversing movement of the carriage 4, past the platen face, via an endless cable 10 attached to carriage 4. The printer is electrically energized, e.g. from a battery transformer located at 11, via a control circuit means 12. Electrical energy is supplied to individual print/cartridges by means of ribbon cables 13 which have terminals 14 in the front inner portion of each of support nests 5–8.

Referring now to FIG. 2, there is shown one useful print/cartridge embodiment 20, which is adapted to be removably inserted into an operative relation with the printer via carriage 4. The print/cartridge 20 is adapted to be disposable when empty of ink and in general comprises an ink supply reservoir 21 and cover member 22, which covers the ink reservoir and coarsely positions the print head assembly 23 in nests 5–8. The print head assembly 23 is mounted on the cover member and comprises a driver plate 24 having a plurality of electrical leads 25 formed thereon. The leads 25 extend from connector pads 26 to resistive heater elements (not shown) located beneath each orifice 29 of a linear orifice array formed in orifice plate 27. Ink from reservoir 21 is supplied through cover member 22 to a location beneath each orifice 29 of plate 27 (and above the heater element for that orifice). Upon application of an electrical print pulse to a terminal pad by the printer control, the corresponding resistive heater element causes an ink condition which ejects a printing ink droplet from its corresponding orifice 29. The orifice plate 27 can be electroformed using photofabrication techniques to provide precisely located orifices and is attached to driver plate 24, which is in turn affixed to the cover member 22. Thus it will be appreciated that even though the linear array of orifices 29 is precisely located within the orifice plate 27, its position vis-a-vis the locating portions of cover member 22 is not necessarily consistent for different disposable print/cartridges. Print/cartridges of the type just decribed are known in the art for use in single print/cartridge printers, and, as explained above, the coarse locating structure of cover member is adequate for those applications.

Figure 4B:
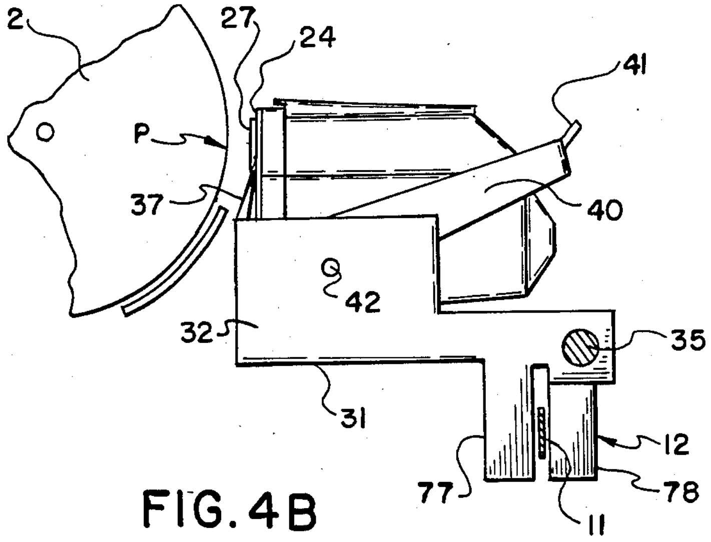
Figure 5:
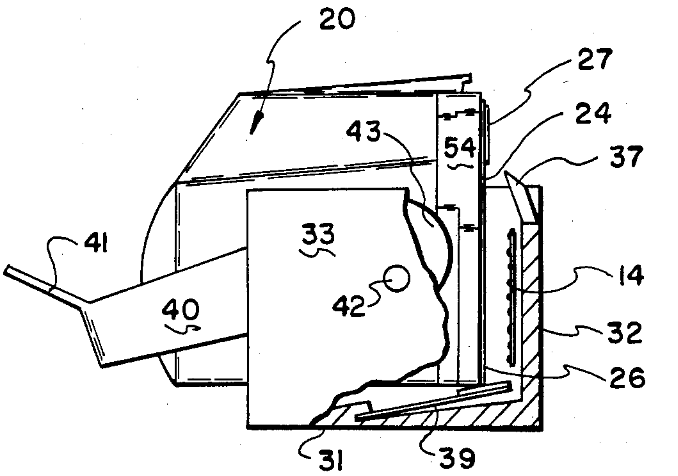
FIGS. 5, 6, 7A, 7B and 8 are views showing various stages of the print/cartridge positioning sequence.
Figure 6:
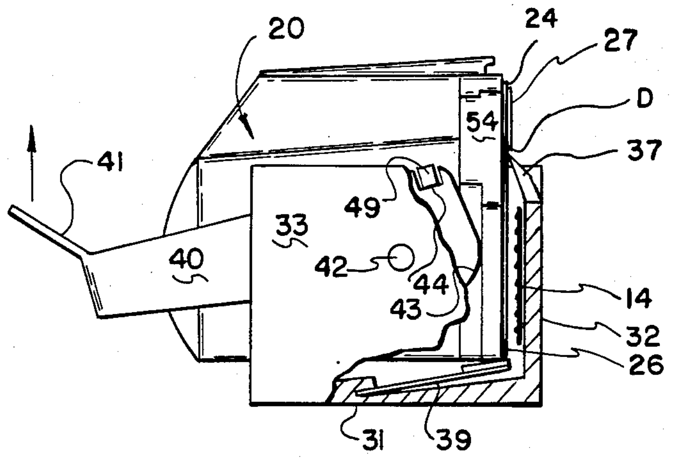
Figure 7A:
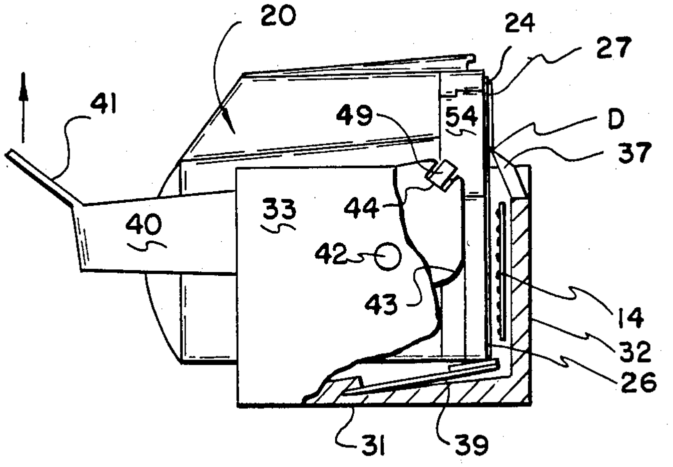
Figure 7B:
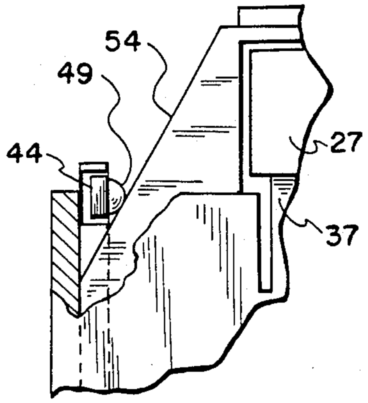

Referring now to FIGS. 3, 4A and 4B, the print/cartridge carriage 4 comprises a bottom wall portion 31, a front wall portion 32 and side wall portions 33 which together form the plurality of print/cartridge nests 5–8 that are adapted to receive and coarsely position print/cartridges with respect to the printing zone P of the printer. The bottom of carriage 4 is mounted on the guide rail means 35 for traversing the carriage across the print zone P in a precisely uniform spacial relation to the platen 2 and in a direction substantially parallel to the axis of that platen's axis of rotation. Thus, the direction of the carriage traverse is substantially orthogonal to the direction of print medium advance.

The top of the front wall 32 of each print/cartridge nest 5–8, has, as an upper extension, knife portions 37, which form reference edges that are precisely colinear, parallel to the direction of carriage translation and equidistantly spaced from the linear print zone P. Mounted on the outer side walls of the nests of the carriage 4 are fastening means 40 for contacting print/cartridges, which have been inserted into nests 5–8, and moving such print/cartridges so that their orifice plates are in precise interrelationship in the printer apparatus. Thus fastening means 40 comprises lever arm portions 41, hinge portions 42, camming portions 43 and seating arm portions 44. The bottom wall 31 of each nest 5–8 also comprises a resilient portion 39 and the fastening means is adapted to move the bottom of an inserted print/cartridge into a forced engagement that downwardly compresses resilient portion 39, when the lever arm portion 41 is moved to the position shown in FIGS. 3, 4A and 4B. When lever arm portion 41 is moved clockwise as viewed in FIGS. 4A and 4B, the fastening means 40 is disengaged and the print/cartridge 20 can be removed from its nest in the carriage 4.

Referring now to FIG. 2, as well as FIGS. 3–8, the system for vertically positioning print/cartridge orifice plates is designed to provide a predetermined sequence of engagements between the print/cartridges 20 and the carriage 4. First, each print/cartridge is inserted into a coarsely positioned alignment resting loosely in its nest on top of cantilever spring 39 (see FIG. 5). As shown in FIG. 3, positioning lugs 51 of the print/cartridge are located in vertical slots 53. As the fastening means 40 is rotated clockwise (as viewed in FIGS. 5, 6, 7A and 8), the cam portion 43 first urges the driver plate 26 into forced contact with knife edge 37 (see FIG. 6). At this stage the cam dimples on seating arm portions 44 have not yet contacted the print/cartridge sidewalls. During continued rotation the cam dimples 49 of seating arm portions 44 contact shoulder portions 54 of an inserted print/cartridge 20 and move the print/cartridge downwardly against the bias of resilient means 39, while cam portion 43 maintains the forward force urging the driver plate into contact with knife edge 37. During this downward movement, knife edge 37 will slide along the face of the driver plate 26 until a detent surface D of the print/cartridge engages the knife edge (see FIG. 7A). In the embodiment shown in FIGS. 2–8, the detent D comprises a lower edge portion of the orifice plate 27. As the engagement between the knife edge 37 and the detent edge D evolves, the print/cartridge is oriented within the nest so that the detent edge D is precisely parallel to the knife edge.

Because the orifice array 29 and the detent edge D of the orifice plate 27 are portions of a commonly photofabricated unit, they can be precisely located relative to one another in an economical fashion. In particular, each linear orifice array is photofabricated to be precisely perpendicular to the lower detent edge D and so that each orifice of the linear array is at its own precise nominal distance from the detent edge. Thus precise indexing of the orifice plate's detent edge D relative to the knife edge 37 of a carriage nest precisely interrelates the printing orifices relative to the the traversing direction of the printer carriage 4. That is, each orifice of each linear array is precisely located at its respective nominal vertical distance from the knife edge and each linear array is precisely perpendicular to the knife edge as well as at a predetermined spacial distance from the print zone P on platen 2.

Figure 8:
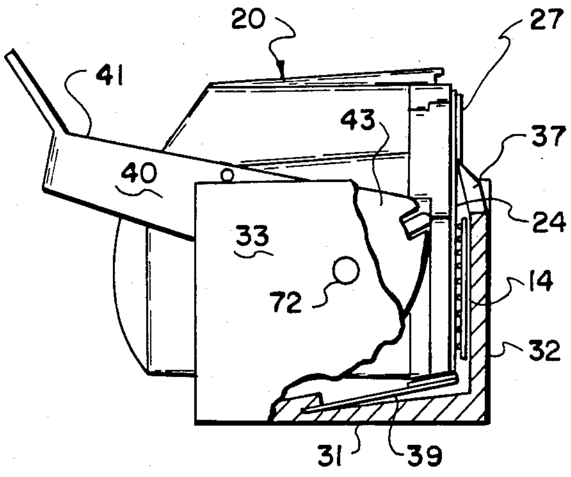

After indexing of the detent edges D on the edge of indexing means 37, continued movement of the lever arm 41 causes cam surface 43 to move connector pads 26 of the print/cartridge into contact with the terminals 14 in the lower portion of nest front wall (see FIG. 8). To allow continued movement of the fasten means 40, after full detenting of the orifice plate, the seating arms 44 are slightly flexible in an outward direction (see FIG. 7B) to allow dimples 49 to slip down the sides of shoulders 54. As shown best in FIG. 7B, the thickness of cantilever seating arm 44 behind dimple 49 is less than the other portions of the fastening means 40 to allow this outward movement. The knife edge 37 can yield slightly to the right (as viewed in FIG. 8) to allow firm contact between the cartridge pads 26 and the nest terminals 14. In this regard, we have found that construction of the knife edge member of a glass-filled nylon material is highly preferred for allowing such flexure, while maintaining an accurate and reliable reference edge over repeated usages.

Reviewing the foregoing, it can be seen that the print/cartridge positioning structure just described precisely positions the orifices of an inserted cartridge relative to the knife edge 37 of its nest. The knife edges 37 of the cartridge nests 5-8 are carefully aligned to be mutually colinear with a uniform spacing from the print zone P. The line defined by the referencing surfaces of knife edges 37 is precisely parallel to the traversing direction of the carriage, which in turn is approximately orthogonal to the direction of print media advance. Because of the photofabrication techniques employed in fabricating orifice plate 27, the location of orifices 29, relative to the detent edge D, is accurately the same for each print/cartridge orifice plate. Thus the plurality of print/cartridges inserted into nests 5-8 will print cooperatively without any offset artifacts due to vertical non-alignments, relative to the print zone P, between the different print/cartridges.

Figure 9:
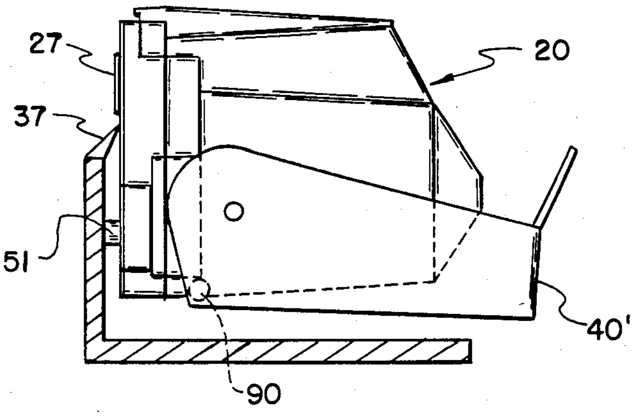
FIGS. 9, 10A, 10B, 11A, 11B and 12 are illustrations of alternative embodiments of print/cartridge positioning means in accord with the present invention.

It will be appreciated that various other structural configurations can be utilized to accomplish physical positioning in accord with the general concepts of the present invention. For example, FIG. 9 illustrates a preferred alternative embodiment wherein a protrusion 90 is provided on the forward portion of fastening means 40' (instead of utilizing a spring means) to assure that the orifice plate 27 of print/cartridge 20 is above knife edge 37 upon initial insertion. When the end of the fastening means 40' is rotated upwardly, the protrusion moves downward to allow the cam surfaces of the fastening means to index the orifice plate on the knife edge.

Figure 10A:
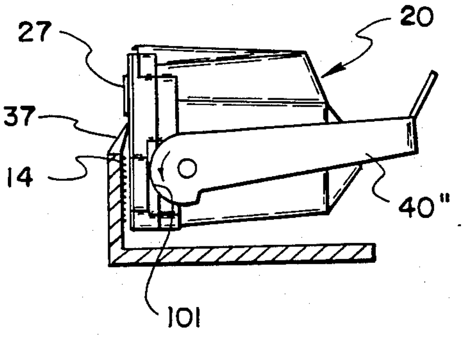
Figure 10B:
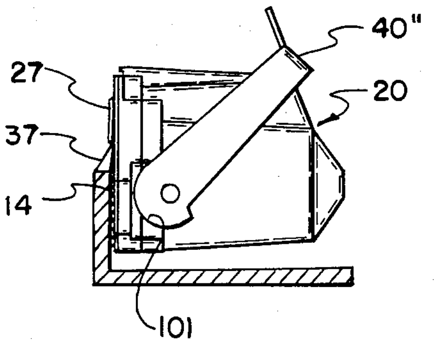

FIGS. 10A and 10B show an alternative cam surface for fastening means 40" wherein a friction surface 101 moves the print/cartridge 20 downwardly until knife edge 37 indexes the lower edge of the orifice plate 27. Continued rotation of the cam surface 101 effects electrical connection between contacts 14 and the print/cartridge connector pads.

Figure 11A:
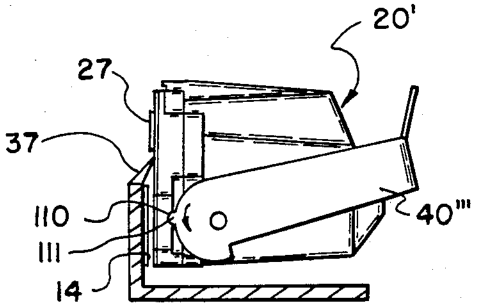
Figure 11B:
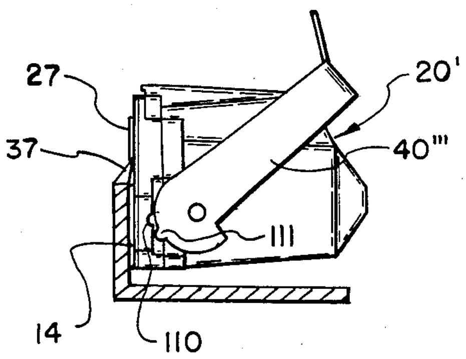

In the construction shown in FIGS. 11A and 11B, the print/cartridge 20' is provided with a notch 110 adapted to cooperate with a nub 111 formed on the cam surface of fastening means 40'''. During the initial engagement shown in FIG. 11A, the downward movement of nub 111 moves the orifice plate 27 into aligning contact with knife edge 37. Upon further rotation, the nub 111 disengages as shown in FIG. 11B and the surface of the cam effects electrical coupling between the terminals 14 and the print/cartridge connector pads.

Figure 12:
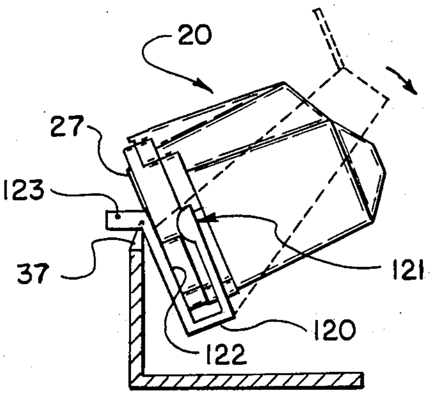

In FIG. 12 the fastening means 120 comprises a pivotal bracket assembly having spring arms 121 adapted to urge an inserted print/cartridge 20 against an opposing bracket wall 122. The entire bracket assembly is mounted for pivotal movement about an axis 123 which is forward and above knife edge 37. As the bracket assembly is rotated downwardly, the knife edge 37 engages and secures the lower orifice plate edge. Further downward rotation of bracket assembly effects electrical engagements of the print/cartridge while spring arms 121 maintain the precise engagement of the orifice plate 27.

The invention has been described in detail with particular reference to preferred embodiments thereof, but it will be understood that variations and modifications can be effected within the spirit and scope of the invention. For example, the positioning structures of the present invention can be used with advantage also with a plurality of insertable print head assemblies, not integral with an ink reservoir but having appropriate detent structure to locate the orifice array with respect to a common reference edge means on the carriage.

We claim:

1. In ink jet printing apparatus of the type having feed means for advancing successive line portions of a print medium past a linear print zone, a system for printing with a plurality of removable print/cartridges of the kind having an orifice plate, said system comprising:

(a) a plurality of print/cartridge carriages constructed to traverse said print zone in a common direction and removably support such print/cartridges;

(b) a plurality of referencing surfaces respectively on each of said carriages, said surfaces being parallel to the direction of said carriages' traverse; and (c) fastening means for moving supported print/cartridges into a precise detent relation with respective referencing surfaces of said carriages;

said referencing surfaces comprising knife edge portions respectively adapted to engage an edge surface of the orifice plates of print/cartridges moved into said detent relation.

2. The invention defined in claim 1 wherein said referencing surfaces are substantially colinear.

3. In ink jet printing apparatus of the kind which includes means for advancing a print medium along a feed path so that successive line portions move sequentially past a linear print zone and which is adapted for use with a print/cartridge of the type including an ink reservoir, drop generator elements, electrical leads to such elements and an orifice plate having a linear array of orifices aligned with respective drop generator elements, a print/cartridge interface construction for accurately positioning a plurality of such print/cartridges for cooperative printing and comprising:

(a) carriage means, including a plurality of integral print/cartridge support means and mounted for movement in a traversing direction adjacent said linear print zone;

(b) a plurality of referencing surfaces, each constructed on said carriage means in alignment with a respective print/cartridge support means, said referencing surfaces comprising knife edge portions precisely parallel to the direction of carriage means traverse; and (c) indexing means for urging received print/cartridges into a condition wherein an edge surface of their orifice plates are indexed to said knife edge portions.

4. In ink jet printing apparatus of the kind which includes means for advancing a print medium along a feed path so that successive line portions move sequentially past a linear print zone and which is adapted for use with a print/cartridge of the type including an ink reservoir, drop generator elements, electrical leads to such elements and an orifice plate having a linear array of orifices aligned with respective drop generator elements, a print/cartridge interface construction for accurately positioning a plurality of such print/cartridges for cooperative printing and comprising:

(a) a plurality of support means, each mounted for movement in a traversing direction adjacent said linear print zone, for receiving such print/cartridges;

(b) a plurality of referencing surfaces, each constructed for traversing movement with a respective print/cartridge support means, said referencing surfaces being precisely colinear and parallel to the direction of support means traverse;

(c) a plurality of terminal means each constructed for traversing movement with a respective print/cartridge support means; and (d) indexing means for urging received print/cartridges into a condition wherein a detent portion of its orifice plate is indexed to the referencing surface on its receiving support means and its electrical leads are operatively coupled to respective terminal means.

5. The invention defined in claim 4 wherein said referencing surfaces comprise knife edges and said support means each include movable means for (i) holding a received print/cartridge with its orifice plate above said edges and (ii) moving to allow engagement between the edge of the print/cartridge orifice plate and said knife edges.

6. The invention defined in claim 5 wherein said support means each include means for guiding a received print/cartridge to maintain proper alignment of its detent portion with said referencing surface during print/cartridge urging by said indexing means.

7. The invention defined in claim 4 wherein said support means include movable means for initially support received print/cartridges with their detent portions in a location above said referencing surface and said indexing means include cam means movable into contact with received print/cartridges in a manner:

(i) initially forcing a lower print/cartridge portion into firm contact with said referencing surface;

(ii) next moving such print/cartridge downward while maintaining said initial forcing so that the print/cartridge detent portion and said referencing surface are engaged; and (iii) next moving the print/cartridge leads into operative contact with said terminals while maintaing said referencing surface and detent engagement.

8. The invention defined in claim 7 wherein said referencing surfaces are constructed to flex during such terminal contacting.

9. In ink jet printing apparatus of the kind which includes means for advancing a print medium along a feed path so that successive line portions move sequentially past a linear print zone and which is adapted for use with a print head of the type including drop generator elements, electrical leads to such elements and an orifice plate having a linear orifice array predeterminedly spaced from, and oriented substantially perpendicular to, a linear edge of the orifice plate, a print head interface construction for accurately positioning a plurality of such print heads for cooperative printing and comprising:

(a) a plurality of support means, each mounted for integral movement in a traversing direction adjacent said linear print zone, for receiving such print heads;

(b) a plurality of linear knife edge surfaces, each constructed for traversing movement with a respective print head support means, said knife edge surfaces being precisely parallel to the direction of support means traverse;

(c) a plurality of terminal means each constructed for traversing movement with a respective print head support means; and (d) indexing means for urging received print heads into a condition wherein the linear edge of its orifice plate is indexed to the knife edge of its receiving support means and its electrical leads are operatively coupled to respective terminal means.

10. The invention defined in claim 9 wherein said support means each include movable means for (i) holding a received print head with its linear orifice plate edge above its respective knife edge and (ii) moving to allow indexing of the orifice plate edge.

11. The invention defined in claim 9 wherein said support means each include means for guiding a received print head to maintain proper alignment of its respective orifice plate edge with said knife edge during print head urging by said indexing means.

12. The invention defined in claim 9 wherein said support means include movable means for initially supporting received print heads with their linear orifice plate edges in a location above said knife edges and said indexing means include cam means movable into contact with received print heads in a manner:

(i) initially forcing a smooth print head portion into firm contact with said referencing surface;

(ii) next moving such print head downward while maintaining said initial forcing so that the print head's orifice plate edge and said knife edge are engaged; and (iii) next moving the print head leads into operative contact with said terminals while maintaining said knife edge engagement.

13. The invention defined in claim 12 wherein said knife edges are constructed to flex during such terminal contacting.

14. In ink jet printing apparatus of the type having feed means for advancing successive line portions of a print medium past a linear print zone, a system for printing with a plurality of removable print/cartridges comprising:

(a) a plurality of print/cartridge carriages constructed to traverse said print zone in a common direction and removably support such print/cartridges;

(b) a plurality of referencing surfaces respectively on each of said carriages, said surfaces being parallel to the direction of said carriages' traverse; and (c) fastening means for moving supported print/cartridges into a precise detent relation with respective referencing surfaces of said carriages;

each of said carriages including means for supporting a print/cartridge in a coarsely located position with the detent surface of the print/cartridge spaced from said referencing surface and cam means for moving a print/cartridge into said precise detent relation.

* * * * *